Figure 10:
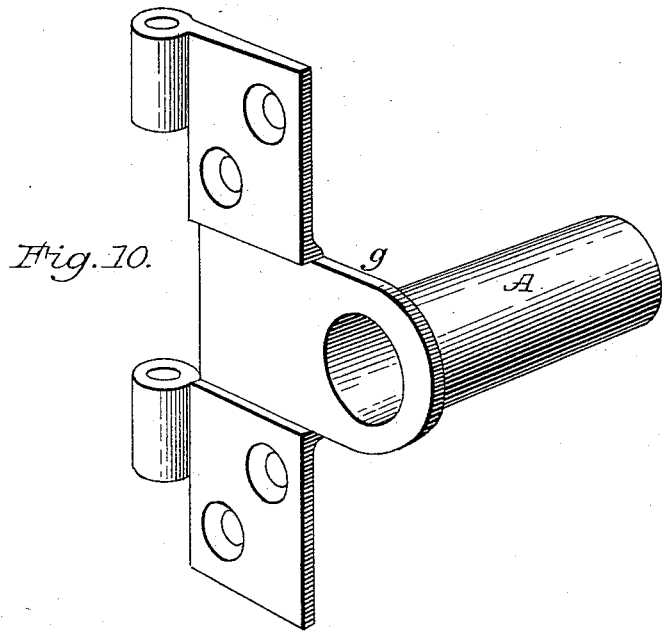

(No Model.)  6 Sheets—Sheet 1.
R. R. BALL.
PNEUMATIC-DOOR CHECK.
No. 452,744.  Patented May 19, 1891.
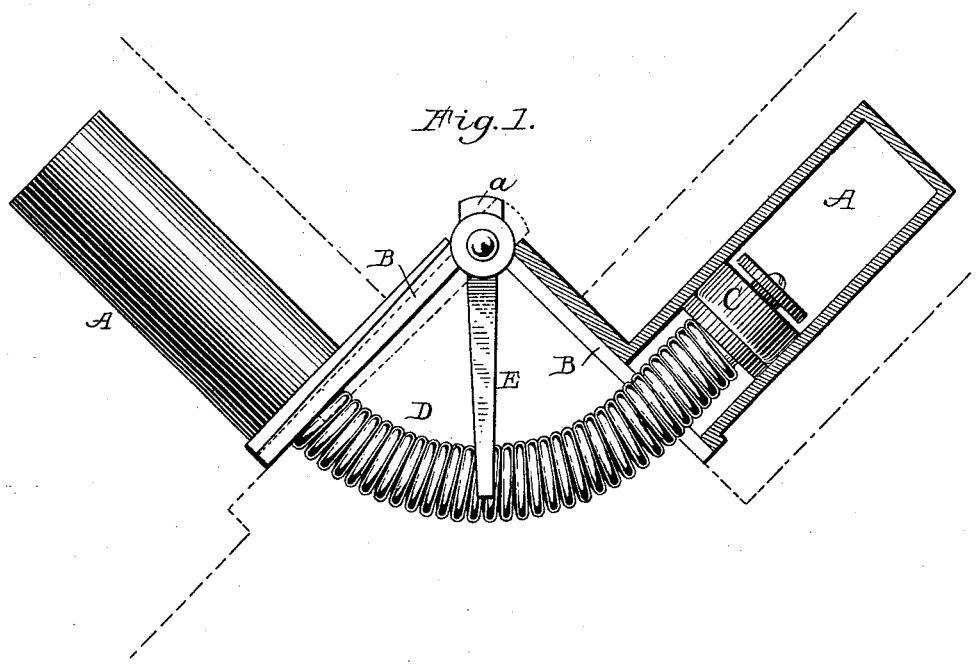
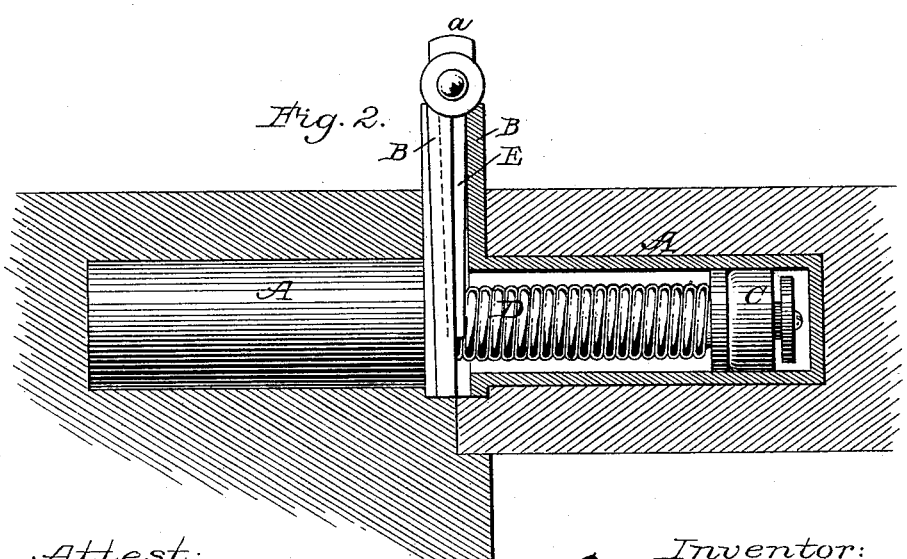
Attest:
Philip F. Larner
Howell Little
Inventor:
Robert R. Ball
By Wm. C. Wood
Attorney
THE NORRIS PETERS CO., PHOTO-LITHO., WASHINGTON, D. C.

(No Model.) 6 Sheets—Sheet 2.
R. R. BALL.
PNEUMATIC DOOR CHECK.
No. 452,744. Patented May 19, 1891.
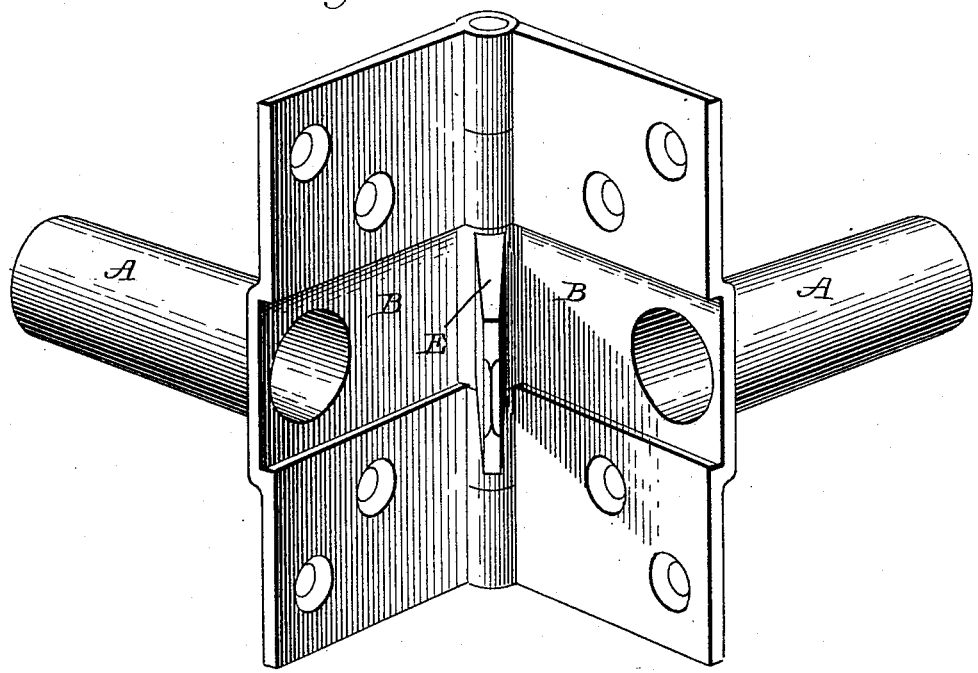
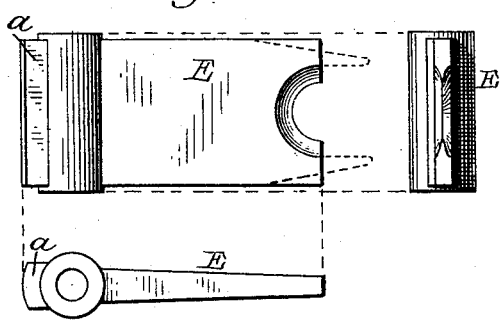
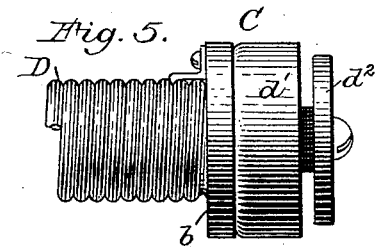
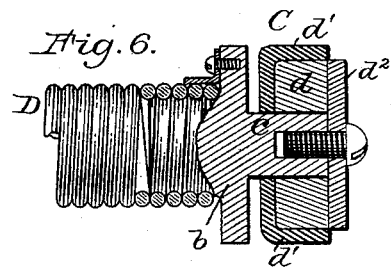
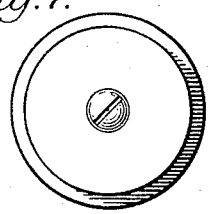
Attest:
Philip F. Larner
Howell Barth
Inventor:
Robert R. Ball
By [Attorney]

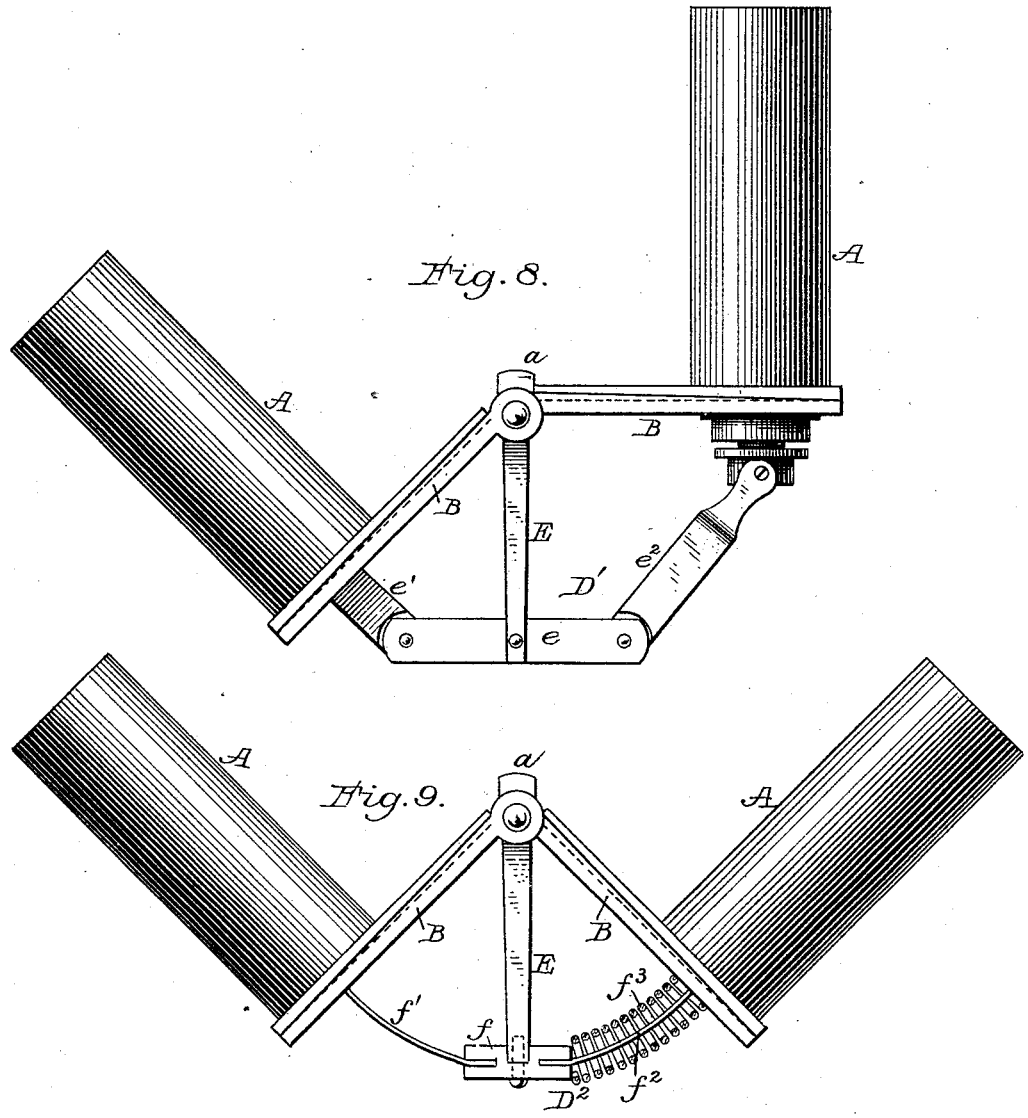

(No Model.) 6 Sheets—Sheet 4.
R. R. BALL.
PNEUMATIC DOOR CHECK.

No. 452,744. Patented May 19, 1891.

Attest:
Philip F. Larner
Howell Bartle

Inventor:
Robert R. Ball
By M. Osgood
Attorney (No Model.) 6 Sheets—Sheet 5.
R. R. BALL.
PNEUMATIC DOOR CHECK.
No. 452,744. Patented May 19, 1891.
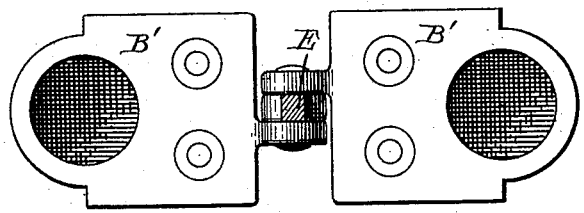
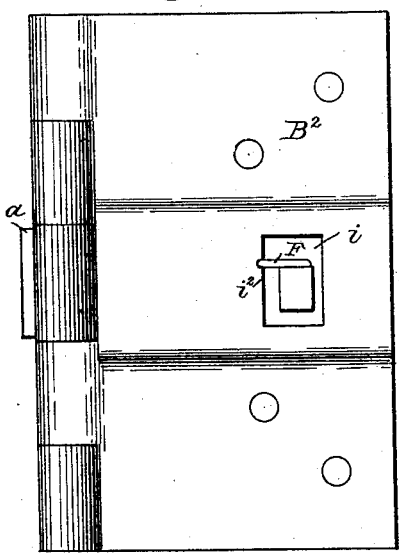
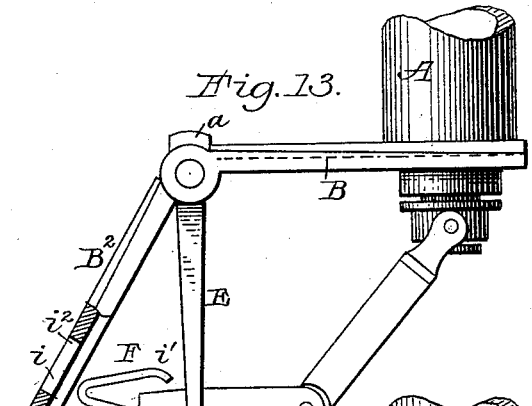
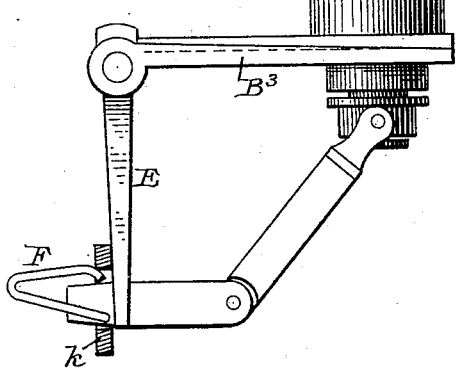
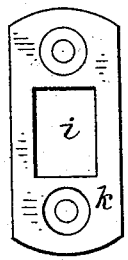
Attest:
Philip F. Larner
Howell Little
Inventor:
Robert R. Ball.
By [signature]
Attorney (No Model.)  
6 Sheets—Sheet 6.

R. R. BALL.
PNEUMATIC DOOR CHECK.

No. 452,744.  Patented May 19, 1891.

Attest:  
Philip F. Larner  
Lowell Bartle

Inventor:  
Robert R. Ball  
By his Attorney

UNITED STATES PATENT OFFICE.

ROBERT R. BALL, OF NEW YORK, N. Y., ASSIGNOR, TO THE VAN WAGONER & WILLIAMS COMPANY, OF SAME PLACE.

PNEUMATIC DOOR-CHECK.

SPECIFICATION forming part of Letters Patent No. 452,744, dated May 19, 1891.

Application filed August 27, 1890. Serial No. 363,192. (No model.)

*To all whom it may concern:*

Be it known that I, ROBERT R. BALL, of the city, county, and State of New York, have invented certain new and useful Improvements in Door-Checking Devices; and I do hereby declare that the following specification, taken in connection with the drawings furnished and forming a part of the same, is a clear, true, and complete description of my invention.

The objects of my invention are to provide for air-cushioning a closing door in such a manner and by such means that effective service will be assured under varied conditions, and an obviation of unsightly exposure of the door-checking apparatus.

My novel apparatus in its best form involves the use of two air-cushioning cylinders, and in other forms one cylinder, with appropriate pistons and one or two rods, either simple or complex, which, although they can be deflected in a plane at right angles to the vertical surface of a door or its frame, are centrally braced, so that they can effectively operate with thrusting action as well as tensile strain, said rod freely conforming to the arc of a circle of which the door-hinge pivot-line is a center.

My door-check in its various forms is so organized that it can be located, as heretofore, closely adjacent to the hinged edge of a door, so that the two air-cushioning cylinders may be respectively snugly housed in the adjacent door-stile and the coincident portion of the door-frame, or one of them may be thus housed in the frame, as with certain prior door springs and checks, but with the other cylinder lying closely adjacent to the appropriate surface of a door-stile, as when the closing of thin light doors is to be checked. So, also, when a single cylinder and its piston is employed the one cylinder may be housed in the door-frame or in the door-stile or outside of the latter and parallel with its lateral surface. The one or the two pistons being actuated or controlled by means of centrally-braced rods, which can thrust as well as pull, and which substantially conform to the arc of a circle centered by the hinge-pivots of the door, also enables a complete door-checking device to be combined with a hinge, thus affording a neat, compact, and comparatively inexpensive door-check, which can be applied to service during the initial hanging of a door with no additional labor than that required for boring a hole to receive the one or the two air-cylinders, and extra labor is lessened in the use of one form of my door-check having but one cylinder and adapted to lie outside of the door-stile, this requiring only that the door-jamb be roughly mortised and a mortise-escutcheon or face-plate applied.

It is to be understood that it is not new in combined door springs and checks either to combine with one leaf of a hinge or to use independently thereof a cylinder containing a piston operating as an air-cushioning device; but in said prior cylinder there was also an expansive spring which directly actuated the closing of a door and meantime forced the piston throughout its inward movement, and the piston was attached to a complex link, which was composed of a set of flat plates, after the manner of a riveted chain, and the ends of the plates were provided with coincident abutting surfaces, and hence, although said complex link might be considered as a deflective piston-rod, it differs materially from mine in that while it operated with a tensile or withdrawing action it could not effectively operate with thrusting force on the piston, whereas in my door-checks the thrusting force on the piston is communicated from the door and is properly transmitted from the door at all times, and although a door-closing spring might be used in my cylinders so as to operate a door-closing device, as in said prior devices, said spring would in no manner affect or modify the operation of any portion of my door-check; whereas if the spring should be taken from the cylinder of said prior device, its operation as a door-check would be practically defeated.

After describing my invention as embodied in door-checks of various forms, illustrated in the drawings, the several features deemed novel will be duly specified in appropriate clauses of claim hereunto annexed.

Figure 11:
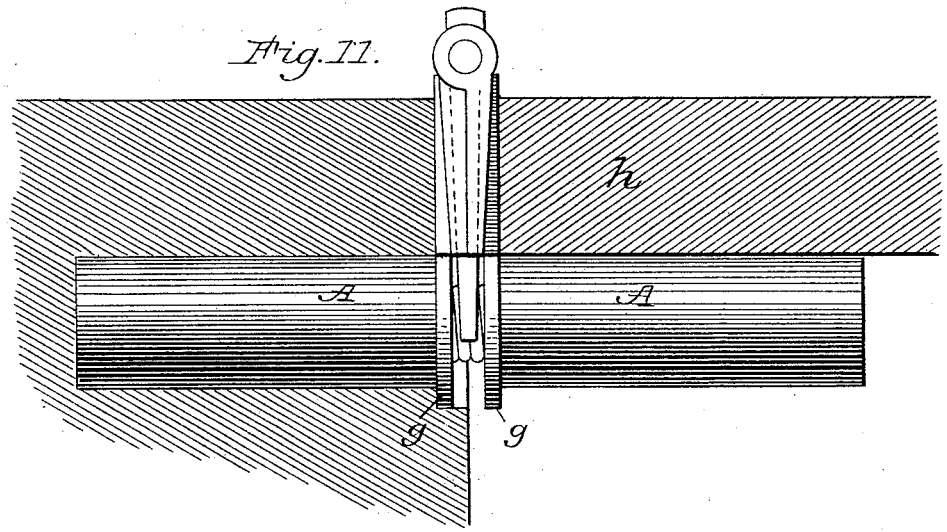
Figure 17:
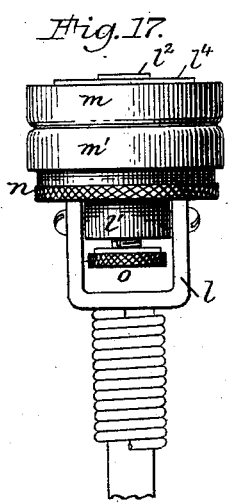
Figure 18:
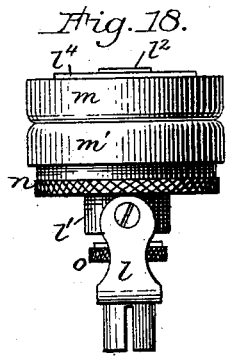
Figure 19:
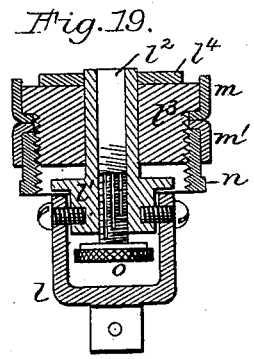
Figure 20:
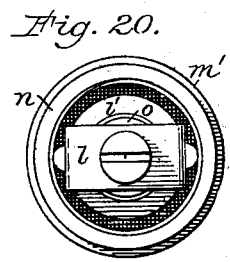
Figure 22:
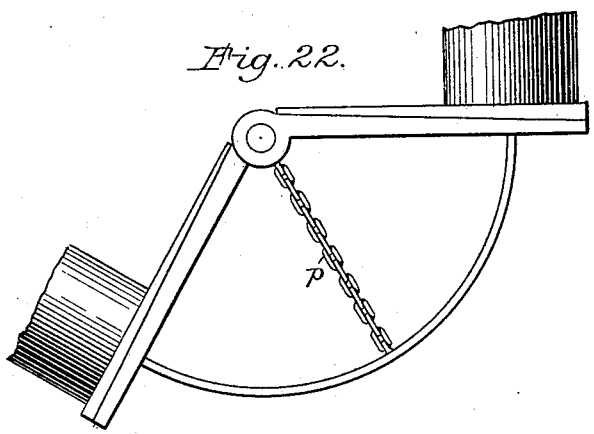
Figure 21:
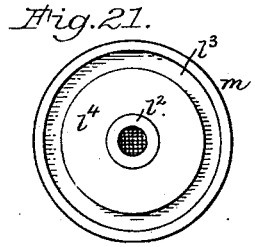
Figure 23:
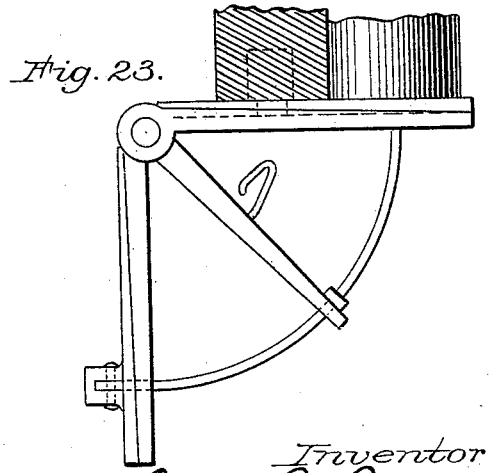

Referring to the drawings, Figure 1 illustrates in top view and partially in section one of my door-checks in an approved form to serve also as a hinge, a door and its jamb or frame being therewith indicated in dotted lines and with the door as if well opened. Fig. 2 illustrates the same as when the door is closed. Fig. 3 illustrates the hinged face-plates of the device, Fig. 1, the cylinders attached thereto, and a pivoted brace-arm by which the piston-rod is properly controlled, and with said rod and its pistons removed. Fig. 4, in side, top, and edge views, illustrates the said pivoted arm, a modification in the form of the outer end thereof being indicated in dotted lines. Figs. 5, 6, and 7 illustrate one form of piston suitable for use in the air-cushioning cylinders, and also shown in Fig. 1. Fig. 8 illustrates in plan view one of my double-cylinder door-checks with another form of deflective piston-rod, the same being composed of jointed lengths. Fig. 9 in like manner illustrates another form of deflective piston-rod in part as in Fig. 1. Fig. 10 illustrates an air-cylinder with a face-plate serving as one leaf of a hinge, but arranged to locate the air-cylinder along the outer side of a door-stile. Fig. 11 illustrates the application of the form of door-check and hinge of Fig. 10 to a door and its casing. Fig. 12 illustrates the same form of door-check, but with cylinder face-plates, which, although hinged together, are not adapted to operate as the leaves of a true hinge for mounting a door. Fig. 13 illustrates one of my door-checks operating also as a door-hinge and in which but one air-cylinder is employed. Fig. 14 illustrates the same hinge-check in a closed position and exposes the side thereof opposite to the cylinder. Fig. 15 illustrates one of my single-cylinder door-checks, which cannot operate as a door-hinge, and which requires either in the door or in the door-frame a rough mortise and the application of a mortised face-plate, as shown in Fig. 16. Figs 17 and 18 in two side views illustrate another form of piston and its rod, the same being also partially shown in Fig. 9. Figs. 19, 20, and 21 in various ways, readily apparent, illustrate the construction of said piston of Fig. 14. Fig 22 illustrates a flat spring piston-rod with another form of centrally-attached tie or brace against outward "buckling" or crippling. Fig. 23 illustrates one of my door-checks suitable for use on doors which are restricted to a ninety-degree swinging movement, as when opening into a narrow entry or passage-way.

Referring now to Figs. 1 to 7, inclusive, it is to be understood that, although the form of my door-check as thereby illustrated is so organized as a whole as to operate as a door-checking hinge, and that such an organization will be duly claimed by me, my invention extends beyond the combination of the door-checking devices with a true hinge, because, as a matter of fact, my air-cushioning cylinders, whether one or two be employed, should have appropriate face-plates or some suitable means for securing said cylinders in position for service, and hence to afford a true hinge will involve only such a construction of the face-plates as will enable them to serve as the leaves of a door-hinge.

The air-cushioning cylinders A are, as a rule, preferably counterparts, and they have interior surfaces fitted to receive a piston. In some cases the cylinders may, however, be profitably varied in diameter, so that, for instance, the one inserted in a door-frame may be larger than the other and only be actually applied to service when a door is returning from its most widely swung position. Each cylinder has a face-plate, and this can be widely varied in form; but its rear edge must be located adjacent to or upon the hinge-pivot line of the door with which the door-check is to be used.

In the door-check shown in Figs. 1 and 2 the face-plates B are of such form as to serve as the leaves of a hinge suitable for use in mounting a door.

In each cylinder there is a piston C, which may be of any of the well-known forms, and in most cases it should be provided with adjustable means for adjusting the packing and controlling the passage of air outwardly from the inner end of the cylinder, although in cheap varieties of my door-checks longitudinal scores in the packing-surface of the piston will serve a fairly good purpose. This particular piston C will be hereinafter more fully described.

The two pistons are connected together by a piston-rod D, which can be quite widely varied in its form and construction, if it be capable of deflection from a straight line, in a plane at right angles to the plane of the pivotal connections or hinge-line at the junction of the two face-plates or leaves, so that during the opening and closing of a door said rod may maintain good pulling and thrusting relations as to either or both pistons. This particular form of piston-rod is specially desirable, because it can properly withstand tension and thrust and is deflective in the arc of a circle, and, more than that, it is extensible and contractible to a slight degree in the operation of the door-check, because said rod is in the form of a spiral spring composed of strong wire and quite closely coiled.

Although ninety degrees of swinging movement of a door always fully opens its doorway, the farther backward swinging of the door to more or less extent is a frequent occurrence, and it is on such occasions that specially objectionable shock or slamming is involved. When one of these checks is in use and the door is opened, either or both pistons will be promptly actuated; but either can be so arranged that the initial movement of the door will affect a particular one of the pistons and not the other until all or a considerable portion of a ninety-degree movement of the door is completed, whereupon the other piston will then be affected until the door is for the moment at rest, and when the door is released and the closing movements commenced the piston first affected will in substance advance slowly in its cylinder, leaving the other to bear the thrust of the terminal closing movement. It will be observed that with the movable cylinder there will be at times only an apparent movement of its piston, in that if the piston be held against movement the movement of the cylinder will change its relation to the piston with the same effect as if the piston had been moved while the cylinder was at rest.

The deflective character of the piston-rod under the strains thereon is liable to result in buckling or crippling the rod at or near its middle, and to prevent this I employ a movable strut, arm, or link, which is connected or applied, respectively, to the rod midway of its length and to the face plate or plates at the junction of their hinged edges. In this instance, Figs. 1, 2, 3, and 4, this link is a stiff arm or lever E, which is hinged to one or both face-plates in line with their hinge-pivot. At its outer end this arm may be connected positively with the rod or to an interior block within the coiled wire, or it may be provided with slender extensions, as indicated in dotted lines in Fig. 4, which can be bent toward each other enough to cause a partial grasping of the coiled wire rod, or said arm, being concaved at its outer end, may have one or two sharpened edges which can occupy a space or two between the convolutions of wire, one function of said arm being to prevent the rod from buckling or bending toward the hinge-joint during the opening of a door, and in some cases to prevent the outward buckling of the rod during the closing movement of a door. As here shown, the brace also serves to effectively transmit force from one piston to the other. This particular form is also a lever, its long arm extending from its pivot to the rod and its short arm $a$ extending rearwardly from said pivot, so that after a door has been partially opened an adjacent edge of the movable face-plate or hinge-leaf will so abut against the side of said short arm as to cause the long arm to swing and so aid in the pulling out of the piston in the cylinder which is not movable. Variations as to this operation of said lever are easily provided for by varying the spaced relations between said short arm and its abutting surface on the face-plate.

In order that the arm or lever E may be securely housed and still permit the face-plates or hinge-leaves to close flatly, both of the plates or leaves are recessed at their coincident sides, as clearly indicated.

The piston C, although simple in its construction, is capable of performing good service. It is shown in detail in Figs. 5, 6, and 7. Said piston embodies a head $b$, which is provided with a spirally-scored stem for engagement with the coiled wire rod and a plain spindle $c$, projecting centrally from its opposite face. On this spindle a packing-disk $d$, with its cup-shaped packing $d'$, is so mounted that it may slide quite freely thereon between a confining-disk $d^2$ and the coincident inner face of the head $b$. While the piston is being drawn outwardly, the cup-shaped packing fails (as is usual with all packing of similar form) to prevent the passage of more or less air in avoidance of a vacuum behind the piston; but when forced in the opposite direction the periphery of the packing is expanded and the air is compressed to a degree commensurate with the closing force of a door modified by such escape of air as may be specially provided for—as, for instance, in this case in the space between the packing-disk and the spindle $c$ and whatever space may be available between a portion of the packing and the coincident face of the head $b$; and it will be seen that the substantial closure of the joint between said head and the rear portion of the packing is effected by the movement of the packing and its disk with its cylinder, instead of being induced by the compression of air within the cylinder. The slightly-sliding action of the packing-hub on its spindle just prior to the sliding movement of the piston in its cylinder is obviously effective in inducing the latter sliding movement, especially when piston-rods are used which yield slightly to end-thrusts.

Instead of having a piston-rod which is not only deflected in the arc of a circle, but is also extensible or contractible, said rod may be made up of parts neither of which is deflectible in itself, provided the rod as a whole be capable of effectively withstanding both tension and thrust during the operation of the door-check—as, for instance, as shown in Fig. 8, wherein the face-plates and cylinders are as before described with a piston of another form. A flexibly-jointed rod $D'$ is composed of three parts of about equal length. A central part $e$ is rigidly secured at its middle to the outer end of a lever-arm E, the latter being substantially as before described. The parts $e'$ $e^2$ are in each instance respectively pivoted to one end of said central part $e$ and to a piston. In no material respect does the operation of this door-check differ from that of the one first described.

Still another variation in the form of the deflective piston-rod is shown in Fig. 9, wherein the rod $D^2$ is complex, in that it embodies a central block $f$ and on one side thereof a flat strong but flexible part or length $f'$, and on the other side a similar flat length $f^2$, supplemented by a surrounding length of coiled wire $f^3$, the whole constituting a rod suitable for pistons which co-operate with two cylinders, and hinged leaves or face-plates and a lever-arm, which are each substantially as before described. It will be seen that each of these piston-rods is or may be not only braced by the centrally-attached lever-arm as against both inward and outward buckling or crippling, but in the form of rod, Fig. 9, the main requirement is as against central outward displacement, and hence, in lieu of said stiff arm or lever, a mere link or chain will serve a good purpose with some forms of rod, as will be more fully hereinafter explained, it being understood that the face-plates should in all cases be so recessed as to well house the link in whatever form it may assume when a door is closed.

As thus far described, the air-cushioning cylinders are in each instance adapted to be tenoned in or to occupy bored holes or mortises both in the door-stile and door-frame. So far as the frame is concerned this involves no special objection; but to thus mortise the stile of a thin light door would seriously weaken it, and hence it is desirable that one cylinder be locatable outside of a door-stile and parallel horizontally with its surface—as, for instance, as illustrated in Figs. 10 and 11, wherein, as will be seen, the cylinders project from outwardly-curved ears $g$, which project from appropriate edges of the face-plate, enabling one of said cylinders to be located outside of the door-stile $h$, as clearly indicated in Fig. 11.

As has hereinbefore been stated, my door-checking device, although in its best forms when it is embodied with face-plates which are so extended as to form or constitute hinge-leaves, possesses much practical value when organized to serve only as a door-check—as, for instance, as illustrated in Fig. 12, wherein a door-check is shown which is well adapted for use on very thin doors and on screen-doors. In this instance the face-plates $B'$ are constructed solely to serve as mounting media for the cylinders; but they are also hinged together at their rear edges, mainly for affording a pivotal support for the arm E, which may be, as before described, with or without its rearwardly-projecting portion; but if the latter be employed then the movable face-plate will abut against it in effecting its swinging movement precisely as if said plate were the leaf of a door-hinge.

It will be readily seen that without any brace two air-cylinders and their pistons with a deflectible piston-rod will readily operate as a door-check if the opening of the door be much restricted—as, for instance, when used on each of a pair of swinging doors—and that in that form the cylinders may be quite short, inasmuch as both pistons will operate either together or one after the other in point of time.

In each of the forms of my door-check thus far described two cylinders are employed; but I have called attention to the fact that one cylinder (the non-movable) and its piston serve as effective means for checking the free swinging movement of the lever-arm E during the initial and partial opening of a door, and it is to be understood that said means may be varied without departure from certion portions of my invention, and such a variation becomes imperative if but one air-cushioning cylinder be employed, as in certain forms of my door-check—as, for instance, as illustrated in Figs. 13 and 14, wherein the one cylinder and its face-plate B is as in Fig. 1, and it co-operates with the leaf $B^2$ in forming a door-hinge. The lever-arm E is mainly as before described, and it is coupled to a piston-rod and piston, as in Fig. 8, although it might as well be coupled to a piston, as in other forms shown. This device, having no second cylinder and piston to restrict the free movement of the lever-arm, has in substance an equivalent therefor in this connection in the form of a frictional locking and unlocking spring F, which is carried by the arm E and co-operates with a properly proportioned and located mortise at $i$ in the leaf $B^2$, the short bend at $i'$, near the free end of said spring, engaging under yielding contact with the rear surface $i^2$ of the leaf at one side of the mortise, so that it will resist for a while the tendency of the arm to swing, but also so as to release it when a door has been partially opened to a certain predetermined degree. When an opened door is swung inward or has been released for closure, the first result is for the spring F to partially enter its mortise $i$, and then the arm E rests until while the piston traverses its cylinder the closing pressure of the door is sufficient to force the stiff locking-spring into its normal position in the mortise $i$. It will be readily observed that this form of my door-check involves no mode of operation which is restricted to the presence of face-plates which serve as the leaves of a hinge, as is clearly illustrated in Fig. 15. In this embodiment of the main features of my invention the one cylinder has a face-plate $B^3$, which at its rear edge serves as a pivot-support for the lever-arm, and the arm carries the locking-spring F, as before described; but this spring co-operates with a mortise cut to receive it and an escutcheon-plate $k$, Fig. 16, precisely as with the hinge-leaf having the mortise $i$, before described.

In most cases it is desirable to variably adjust the resistance of the air-cushion to the inward movement of the piston, and in many cases to also adjust the frictional contact of the packing with the interior surface of the cylinder.

In Figs. 17 to 21, inclusive, I have shown a piston as devised by me for service in such of my higher-priced door-checks as will warrant desirable complexity with attendant increased cost. The construction of this piston is perhaps best illustrated in Fig. 19, and it is to be considered wholly independent of any special form of rod, although illustrated in Fig. 8 as with one form of rod and in Fig. 17 as having the same form of rod as that shown in Fig. 9. This piston has a forked shank $l$, to which a rod may be attached or which may form a part thereof, and said shank is pivoted to a piston-head $l'$, having a hollow cylindrical stem $l^2$, on which a packing disk or hub $l^3$ may somewhat freely slide between the face of the fixed disk $l^4$ and the inner face or end of the head $l'$. Two cup-shaped packings $m$ and $m'$, reversely arranged, are carried on and by the hub $l^3$, and beneath the peripheral portion of the outer packing $m'$ there is a sleeve-nut $n$ mounted on the hub $l^3$, which is screw-threaded to receive it. The advancing or retiring of this sleeve-nut causes the packing $m'$ to engage more or less closely with the interior surface of the cylinder. The outer end of the hole in the piston-head is screw-threaded and is occupied by the stem of a thumb-screw $o$, having at the inner side of its head a packing-disk. This screw, on being advanced or retired, decreases or increases the air-space within the head, said space being in open communication with the air-space of the cylinder, thus varying the air-cushioning effects. When said set-screw is firmly set in its seat, the interior air-space is at its minimum and no air can escape by way of the more or less loosely fitted screw. If the screw be snugly fitted to the thread in the hub, a graduated air-venting effect may be provided for by means of one, two, or more longitudinal scores in said screw-stem, varying in their length from the inner end, so that when said screw is slightly withdrawn but one score will be opened, the others being uncovered in regular order by the further retirement of said screw. It will be seen that both the thumb-screw and the sleeve-nut are accessible for convenient manipulation when a door has been thrown fully backward and so held.

I have hereinbefore referred to the fact that in some cases a deflective piston-rod will not absolutely require an arm or brace which will resist inward-buckling tendencies on the part of the rod. In door-checks intended for light doors a rod connecting two pistons need be no more than a single flat springy flexible rod, either in uniform thickness or thickened slightly in the middle. In Fig. 22 I have illustrated a double-cylinder door-check embodied with hinge-leaves, and in which a flat rod is employed with fairly good results. It will readily be seen that if the pistons are permitted to move quite freely there will be but little tendency for such a rod to buckle inwardly, but that during the closing of the door from an extreme rearward position an outward-buckling tendency must be developed, and for overcoming this a tension-brace only is needed, and this may be in the form of a short chain $p$, as shown, as well as in the preferred more rigid form, the face-plates being recessed so as to house the chain when it drops to its slackened position. Of course the pistons with this form of rod should have a longer bearing in the cylinder than the preferred forms of rod, or the pistons would be of the solid plunger type and the packing fixed within the mouth of the cylinders.

The rigid swinging arm may be embodied in a door-check having but one cylinder and a piston-rod connected with a hinge-leaf—as, for instance, as illustrated in Fig. 23. This form of my door-check will be adapted for use on light doors or screen-doors located in narrow passage-ways which preclude any wide or undue swinging movement of a door, and it embodies a single cylinder and piston and a face-plate hinged to a leaf, the two serving as a hinge, and the piston-rod, composed of a thin flat springy piece of metal, is rigidly secured at its ends to both the hinge-leaf and to the piston. It will be observed that the operation of this door-check is precisely like those of Figs. 13 and 15 up to the moment that the lever-arm is freed from the control of its frictional locking-spring by, in this instance, abutting against a stop on the rod, and it will be readily seen that a comparatively free sliding piston and a limited opening movement of a door would not cause a release of said arm in said other forms, and that like conditions occur in connection with the door-check, Fig. 23.

It will now be obvious that it is not absolutely essential in the cheapest forms of my door-checks to have the cylinders provided with face-plates of any kind, inasmuch as they can be externally enlarged and screw-threaded at their open ends, so as to admit of their being mounted in bored holes, after the manner of tubular lock-cases, and also that with such cylinders a separate bracket having a brace-arm hinged thereto may be employed as separate parts, said bracket being attachable to a door after the manner of the face-plates, it being necessary with such door-checks that door-hinges of appropriate dimensions should be employed.

Having thus described my invention, I claim as new and desire to secure by Letters Patent—

1. In a door-checking device, the combination, substantially as hereinbefore described, of an air-cushioning cylinder provided at its open end with means by which it may be securely mounted for service, a piston in said cylinder provided with a suitable rod capable of deflection, as in the arc of a circle, a piston-rod-controlling arm which engages centrally with said rod and is located in the same horizontal plane and is pivoted on an axis standing at right angles to said plane at the rear of said face-plate, and means for checking the free swinging movement of said arm while the piston is changing its position in the cylinder, as during the opening movement of a door.

2. In a door-checking device, the combination, substantially as hereinbefore described, of a pair of oppositely-located air-cushioning cylinders, a piston in each cylinder, and a deflectible piston-rod which is connected with both piston-rods.

3. In a door-checking device, the combination, substantially as hereinbefore described, of a pair of oppositely-located air-cushioning cylinders, a piston in each cylinder, a deflectible piston-rod which is connected with both pistons, and a controlling-link which engages centrally with said rod and prevents it from buckling or crippling while in service.

4. In a door-checking device, the combination, substantially as hereinbefore described, of a pair of oppositely-located air-cushioning cylinders provided with face-plates rearwardly projecting and pivoted to each other, pistons in said cylinders, a piston-rod which is flexible in a horizontal plane, and a brace or arm which engages said rod centrally and is pivoted to the rear edges of the face-plates.

5. In a door-checking device, the combination, substantially as hereinbefore described, of a pair of air-cushioning cylinders provided with face-plates pivoted at their rear edges, a piston in each cylinder, a deflective piston-rod connected with both pistons, and a brace-lever pivoted to the rear edges of said face-plates, connected at its front end to said rod centrally and at its rear end projecting beyond its pivot for engagement by one of said face-plates during a portion of the movement of said plate away from the other face-plate, to which it is pivoted, and thereby swinging said arm.

6. In a door-checking device, the combination, substantially as hereinbefore described, of a pair of oppositely-located air-cushioning cylinders provided with face-plates which are pivoted together and adapted to serve as a door-hinge, pistons in each cylinder, and a deflective piston-rod connected with both pistons.

7. In a door-checking device, the combination, substantially as hereinbefore described, of a pair of pivoted face-plates extended to form and operating as door-hinge leaves, an air-cushioning cylinder projecting from the outer side of each plate or leaf, pistons in said cylinders connected together by a deflective piston-rod, and a brace or arm attached at one end centrally to said rod and connected at the other end to the pivot of the hinge.

8. In a door-checking device, the combination, substantially as hereinbefore described, of a pair of air-cushioning cylinders, connected leaves or plates which serve both as a door-hinge and as face-plates for said cylinders, pistons in said cylinders, a deflective piston-rod coupled to both of said pistons, and a swinging brace or lever which is pivotally connected with said plates on the hinge-line and at one end is attached centrally to said rod and at the other end extends beyond its pivot for engagement with one of said plates or leaves during a portion of its opening movement.

9. In a door-checking device, the combination, substantially as hereinbefore described, of an air-cushioning cylinder provided with a face-plate hinged to a second plate, the two to operate as a door-hinge, a piston in said cylinder provided with a piston-rod deflective in the arc of a circle and attached at its outer end to a swinging arm, and means for checking the free swinging movement of said arm while the piston is changing its position in its cylinder during the opening movement of a door.

10. In a door-checking device, the combination, substantially as hereinbefore described, of an air-cushioning cylinder, a pair of hinged leaves to serve as a door-hinge, one of said leaves serving as a face-plate for said cylinder, a piston in said cylinder, a deflective piston-rod, and a lever pivoted to said leaves at the hinge-line, connected at its long arm to said rod and at its short arm beyond its pivot adapted to be engaged by one of said leaves and caused thereby to swing, as after the partial opening of a door.

11. In a door-checking device, the combination, substantially as hereinbefore described, of an air-cushioning cylinder, a piston having a flexible or deflective piston-rod, and a packing-hub which can slide slightly with reference to the piston-rod, preceding the change in the relations of the piston with its cylinder.

12. In a door-checking device, the combination, with an air-cushioning cylinder, of a flexible or deflective piston-rod, a piston provided with two oppositely-faced cup-shaped packings, and an adjusting sleeve-nut beneath the flange of the outer packing for variably pinching the bases of both packings and thereby causing the periphery of said flange to vary in its engagement with the interior surface of the cylinder.

13. In a door-checking device, the combination of a pair of air-cushioning cylinders, each containing pistons directly coupled with each other by a rod common to both, said pistons being unequal as to their frictional engagement with their cylinders.

14. In a door-checking device, the combination, with an air-cushioning cylinder, of a forked-shank piston-rod, a piston having a screw-threaded central longitudinal hole, and a thumb-screw fitted thereto at its outer or rear end for varying air-cushioning effects, substantially as described.

ROBERT R. BALL.

Witnesses:
JNO. A. HILLERY,
ERNEST H. BALL.